US010375064B2

United States Patent
Fang et al.

(10) Patent No.: US 10,375,064 B2
(45) Date of Patent: Aug. 6, 2019

(54) METHOD, APPARATUS, AND SYSTEM FOR REMOTELY ACCESSING CLOUD APPLICATIONS

(71) Applicants: Alibaba Group Holding Limited, Grand Cayman (KY); Qiang Fang, Hangzhou (CN); Hongru Zhu, Hangzhou (CN); Qing An, Hangzhou (CN); Yingfang Fu, Hangzhou (CN)

(72) Inventors: Qiang Fang, Hangzhou (CN); Hongru Zhu, Hangzhou (CN); Qing An, Hangzhou (CN); Yingfang Fu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 15/564,177

(22) PCT Filed: Mar. 21, 2016

(86) PCT No.: PCT/CN2016/076879
§ 371 (c)(1),
(2) Date: Oct. 3, 2017

(87) PCT Pub. No.: WO2016/161888
PCT Pub. Date: Oct. 13, 2016

(65) Prior Publication Data
US 2018/0131688 A1    May 10, 2018

(30) Foreign Application Priority Data
Apr. 7, 2015 (CN) .......................... 2015 1 0161901

(51) Int. Cl.
*H04L 29/06* (2006.01)
*G06F 21/12* (2013.01)
(Continued)

(52) U.S. Cl.
CPC ........ *H04L 63/0838* (2013.01); *G06F 21/128* (2013.01); *G06F 21/33* (2013.01);
(Continued)

(58) Field of Classification Search
CPC . H04L 63/0838; H04L 67/141; H04L 63/067; H04L 63/0823; H04L 63/10; G06F 21/128; G06F 21/33
See application file for complete search history.

(56) References Cited

U.S. PATENT DOCUMENTS 5,995,879 A * 11/1999 Ginzel ................. F02D 31/001
123/333
6,047,200 A * 4/2000 Gibbons ................ H04B 1/707
455/574

(Continued)

FOREIGN PATENT DOCUMENTS

| CN | 1592191 A | 3/2005 |
| CN | 1764116 A | 4/2006 |

(Continued)

OTHER PUBLICATIONS

Currie et al., "In-the-wire authentication: Protecting client-side critical data fields in secure network transactions", 2009 2nd International Conference on Adaptive Science & Technology (Year: 2009).*

(Continued)

*Primary Examiner* — Morshed Mehedi
(74) *Attorney, Agent, or Firm* — James J. DeCarlo; Greenberg Traurig, LLP

(57) ABSTRACT

Disclosed herein are methods, apparatuses, and systems for remotely accessing cloud applications. In one embodiment, the method comprises receiving an access request of a requester, sent by a cloud server, requesting being accessed by a controlling party; establishing a secure channel with the
(Continued)

cloud server based on the access request of the requester, sent by the cloud server, requesting being accessed by the controlling party; receiving, via the safety channel, a login key generated based on the access request of the requester sent by the cloud server; generating, based on the login key, a login request for logging into the requester and sending the login request to the cloud server; receiving mode information of a login success returned by the cloud server after the cloud server verifies the login request; and receiving current mode information of the requester pushed by the cloud server, and entering a remote access mode for the requester. The disclosed embodiments can solve the following problems: remote access is not possible between different operating systems; a request for remote access cannot be made between terminals; and wasting unnecessary resources on site traffic. In addition, the method also prevents the risk of password leakage during remote access.

20 Claims, 7 Drawing Sheets

(51) Int. Cl.
  *G06F 21/33* (2013.01)
  *H04L 29/08* (2006.01)
(52) U.S. Cl.
  CPC ........ *H04L 63/067* (2013.01); *H04L 63/0823* (2013.01); *H04L 67/141* (2013.01); *H04L 63/10* (2013.01)

(56) References Cited

U.S. PATENT DOCUMENTS

| | | | |
|---|---|---|---|
| 6,285,357 B1* | 9/2001 | Kushiro | G06F 3/0362 345/168 |
| 6,842,776 B1 | 1/2005 | Poisner | |
| 7,162,543 B2 | 1/2007 | Fischer et al. | |
| 7,302,570 B2 | 11/2007 | Beard et al. | |
| 7,437,457 B1* | 10/2008 | Eisendrath | H04L 63/10 709/204 |
| 7,536,450 B2 | 5/2009 | Motoyama et al. | |
| 7,941,551 B2 | 5/2011 | Anantharaman et al. | |
| 8,291,488 B2 | 10/2012 | Faraboschi et al. | |
| 8,441,494 B2 | 5/2013 | Byford et al. | |
| 8,825,816 B2 | 9/2014 | Deutsch et al. | |
| 8,997,092 B2 | 3/2015 | Gentile et al. | |
| 9,369,357 B2 | 6/2016 | Gentile et al. | |
| 9,407,724 B2 | 8/2016 | Khan et al. | |
| 9,641,599 B2* | 5/2017 | Wesley | H04L 67/10 |
| 2003/0056207 A1 | 3/2003 | Fischer et al. | |
| 2004/0127210 A1 | 7/2004 | Shostak | |
| 2005/0044378 A1* | 2/2005 | Beard | G06F 21/33 713/182 |
| 2005/0188086 A1* | 8/2005 | Mighdoll | G06F 8/65 709/225 |
| 2006/0142878 A1 | 6/2006 | Banik et al. | |
| 2007/0004436 A1* | 1/2007 | Stirbu | H04L 63/0281 455/503 |
| 2012/0166970 A1 | 6/2012 | Gastaldi et al. | |
| 2012/0226772 A1* | 9/2012 | Grube | H04L 67/1097 709/217 |
| 2015/0040210 A1* | 2/2015 | Faaborg | G06F 21/00 726/16 |
| 2015/0112790 A1* | 4/2015 | Wolinsky | G06Q 30/0238 705/14.38 |
| 2016/0094539 A1 | 3/2016 | Suresh et al. | |
| 2016/0260188 A1 | 9/2016 | Harouche et al. | |
| 2016/0261671 A1* | 9/2016 | AbiEzzi | H04L 67/025 |
| 2016/0266012 A1* | 9/2016 | Boutaud | G01B 11/00 |
| 2016/0359983 A1 | 12/2016 | Balogh et al. | |
| 2017/0006137 A1 | 1/2017 | Khan et al. | |
| 2017/0201578 A1 | 7/2017 | Wesley et al. | |

FOREIGN PATENT DOCUMENTS

| | | |
|---|---|---|
| CN | 102196003 A | 9/2011 |
| CN | 102857361 A | 1/2013 |

OTHER PUBLICATIONS

International Search Report to corresponding International Application No. PCT/CN2016/076879 dated Jun. 16, 2016 (2 pages).

* cited by examiner

METHOD, APPARATUS, AND SYSTEM FOR REMOTELY ACCESSING CLOUD APPLICATIONS

CROSS-REFERENCE TO RELATED APPLICATIONS

This application claims the priority of Chinese patent application No. 201510161901.3, filed on Apr. 7, 2015 and entitled "Method, Device and System for Remotely Accessing Cloud Application", and PCT Application No. PCT/CN2016/076879, titled "Method, Device and System for Remotely Accessing Cloud Application" filed on Mar. 21, 2016, the disclosure of each hereby incorporated by reference in their entirety.

BACKGROUND

Technical Field

The disclosure relates to the technical field of remote access, in particular to methods, apparatuses, and systems for remotely accessing cloud applications, requesting remote access to cloud applications, and utilizing a cloud server in remote access.

Description of the Related Art

With the popularity of smart terminals, more people currently use applications on such smart terminals. The operation of different applications differs across applications. Usually, a user might not know how to use an application or operate a certain function of an application, so, the user must ask others how to use the application. If there is no one around or no one knows how to use the application, the user can only use a telephone or other means of communication to ask how to use the application. However, it is usually difficult to obtain an accurate understanding of an application's operation method through a description given over the phone. Therefore, at this point, remote access is needed to solve the problem.

In current systems, common remote access methods are as follows.

1. A remote desktop WEB connection method provided by MICROSOFT. Through an ACTIVEX control, this method provides the same function as a complete terminal server client. Through the ACTIVEX control embedded in a webpage, it is possible to achieve the function of a terminal server being connected to a client server. This technology is based on a WINDOWS RDP protocol, but a terminal not using a WINDOWS system cannot use the protocol to fulfill a remote access request.

2. A Mobile Device management (MDM) technology can achieve management functionality for a terminal. For a mobile terminal that adopts a cloud application, the MDM protocol can only provide access for a server terminal to various accessed mobile devices, but the MDM protocol cannot achieve the function of remote access among various mobile terminals. Particularly, the MDM protocol cannot be applied to the scenario in which a certain client initiates remote access to another client. What can be done through the MDM technology is the function of managing all the terminals that are included in a management domain as well as pushing server information to the terminals. Synchronizing the status of a server terminal to a mobile terminal can be achieved through this way. Nevertheless, this method cannot fulfill the remote access request between terminals.

3. A Remote Framebuffer (RFB) protocol, through which sending screen information of a local terminal to an accessing terminal is made possible. However, with the popularity of smart terminals, most of the time it is the mobile terminals that require remote access. Sending out all the screen information of a local terminal would take up much valuable network traffic resources, and the greatest limitation in this regard is the network speed.

Therefore the current remote access technology has multiple limitations and defects in actual use. In addition, a user may give others his/her own account number and password for the application and let others log into his/her own application to finish any corresponding operations. Although the problem that the user does not know how to use an application or operate a certain function of the application is addressed, such an act puts personal information at risk, leading to security issues of a personal account.

BRIEF SUMMARY

In order to solve the above-mentioned problems, the disclosure provides a method for remotely accessing cloud applications, an apparatus for remotely accessing cloud applications, a method for requesting remote access to cloud applications, an apparatus for requesting remote access to cloud applications, a method for involving a cloud server in remote access, an apparatus for involving a cloud server in remote access, and a system for remotely accessing cloud applications.

An embodiment of the disclosure provides a method for remotely accessing cloud applications, the method comprising: receiving, at a controlling party via a cloud server, an access request of a requester, the access request requesting access by a controlling party, wherein the access request comprises account information of the requester; establishing a secure channel with the cloud server based on the access request of the requester; receiving, via the secure channel, a login key generated through the access request of the requester sent by the cloud server; generating, based on the login key, a login request for logging into the requester and sending the login request to the cloud server, the login request including the login key and the account information of the requester; receiving mode information of a login success returned by the cloud server after the cloud server verifies the login request; and receiving current mode information of the requester pushed by the cloud server, and entering a remote access mode for the requester.

Alternatively, the establishing a secure channel with the cloud server based on the access request of the requester comprises: sending a request, to the cloud server, for establishing the secure channel, wherein the request for establishing the secure channel comprises: a digital certificate of the controlling party; receiving feedback information, sent by the cloud server, about establishing the secure channel; and if the received feedback information indicating approval, establishing the secure channel with the cloud server.

Alternatively, prior to the step of sending a request for establishing the secure channel to the cloud server, the method further comprises: sending a request, to the cloud server, for acquiring the digital certificate of the controlling party, wherein the digital certificate is used for establishing the secure channel with the cloud server; and receiving, from the cloud server, the digital certificate of the controlling party.

Alternatively, the secure channel is an SSL secure channel or a TLS secure channel.

Alternatively, after the step of receiving an access request of a requester, the method further comprises: receiving a selection operation performed on the access request; and sending to the cloud server feedback information generated for the access request of the requester based on a result of the selection operation.

Alternatively, the selection operation comprises: displaying a corresponding selection window within a screen display region of the controlling party; and receiving a selection operation performed on an approval button or a denial button displayed in the selection window.

Alternatively, after the step of receiving current mode information of the requester pushed by the cloud server and entering a remote access mode for the requester, the method further comprises: receiving an operation performed on the requester entering the remote access state; and uploading a result of the operation to the cloud server.

Alternatively, the login key comprises the account information of the requester, account information of the controlling party, a time stamp when the login key is generated, and a verification code produced upon generation of the login key.

Accordingly, an embodiment of the disclosure further provides an apparatus for remotely accessing cloud applications, the apparatus comprising: an access request receiving unit, configured to receive an access request of a requester, sent by a cloud server, requesting being accessed by a controlling party, wherein the access request comprises account information of the requester; a secure channel establishing unit, configured to establish a secure channel with the cloud server based on the access request of the requester, sent by a cloud server, requesting being accessed by a controlling party; a login key receiving unit, configured to receive, via the secure channel, a login key generated through the access request of the requester sent by the cloud server; a login request sending unit, configured to generate, based on the login key, a login request for logging into the requester and sending the login request to the cloud server, the login request including the login key and the account information of the requester; a login receiving unit, configured to receive mode information of a login success returned by the cloud server after the cloud server verifies the login request; and a remote access mode establishing unit, configured to receive current mode information of the requester pushed by the cloud server, and entering a remote access mode for the requester.

Alternatively, the secure channel establishing unit comprises: a secure channel requesting sub-unit, configured to send a request, to the cloud server, for establishing the secure channel; the request for establishing the secure channel comprises a digital certificate of the controlling party; a feedback information receiving sub-unit, configured to receive feedback information, sent by the cloud server, about establishing the secure channel; and a secure channel establishing sub-unit, configured to determine a result of the feedback information receiving sub-unit; if the received feedback information indicating approval, establishing the secure channel with the cloud server.

Alternatively, the apparatus for remotely accessing cloud applications further comprises: a digital certificate requesting unit, configured to, prior to the sending the request to the cloud server for establishing the secure channel, sending a request, to the cloud server, for acquiring the digital certificate of the controlling party, wherein the digital certificate is used for establishing the secure channel with the cloud server; and a digital certificate receiving unit, configured to receive, from the cloud server, the digital certificate of the controlling party.

Alternatively, the secure channel establishing unit is specifically configured to establish an SSL secure channel or a TLS secure channel.

Alternatively, the apparatus for remotely accessing cloud applications further comprises: a selection operation receiving unit, configured to receive a selection operation performed on the access request after the receiving the access request of the requester; and a feedback information sending unit, configured to send to the cloud server feedback information generated for the access request of the requester based on a result of the selection operation.

Alternatively, the selection operation receiving unit comprises: a selection window displaying unit, configured to display a corresponding selection window within a screen display region of the controlling party; and a selection operation receiving unit, configured to receive a selection operation performed on an approval button or a denial button displayed in the selection window.

Alternatively, the apparatus for remotely accessing cloud applications further comprises an operation receiving unit, configured to, after the receiving current mode information of the requester pushed by the cloud server and the entering the remote access mode for the requester, receive an operation performed on the requester entering the remote access mode; and an operation result uploading unit, configured to upload a result of the operation to the cloud server.

Alternatively, the login key receiving unit is specifically configured to receive the account information of the requester, account information of the controlling party, a time stamp when the login key is generated, and a verification code produced upon generation of the login key.

Additionally, an embodiment of the disclosure further provides a method for remotely accessing cloud applications, the method comprising: establishing a secure channel with a cloud server; sending an access request to the cloud server requesting being accessed by a controlling party via the secure channel, the access request comprising account information of the requester and account information of the controlling party; and uploading current mode information of the requester to the cloud server.

Alternatively, the establishing a secure channel with a cloud server specifically comprises: sending a request, to the cloud server, for establishing the secure channel, wherein the request for establishing the secure channel comprises: a digital certificate of the requester; receiving feedback information, sent by the cloud server, about establishing the secure channel; and if the received feedback information indicating approval, establishing the secure channel with the cloud server.

Alternatively, prior to the step of sending a request for establishing the secure channel to the cloud server, the method further comprises: sending a request to the cloud server for acquiring the digital certificate of the requester, wherein the digital certificate is used for establishing the secure channel with the cloud server; and receiving, from the cloud server, the digital certificate of the requester.

Alternatively, the secure channel is an SSL secure channel or a TLS secure channel.

Alternatively, after the step of establishing a secure channel with a cloud server, the method further comprises: receiving a login operation of the requester; sending to the cloud server a login request for logging into the requester, wherein the login request comprising the account information and a login password of the requester; receiving mode information of a login success returned by the cloud server after the cloud server verifies the login request; and establishing a connection with the cloud server.

Alternatively, prior to the uploading current mode information of the requester to the cloud server, the method further comprises: receiving, from the cloud server, feedback information generated for the access request of the requester; and if the feedback information indicating approval, performing the step of uploading current mode information of the requester to the cloud server.

Alternatively, in the step of uploading current mode information of the requester to the cloud server, the method further comprises stopping a local computation of the requester.

Alternatively, the stopping a local computation of the requester comprises inhibiting initiation of the requester, or suspending the initiation of the requester.

Alternatively, the current mode information comprises information not stored in the requester and a current operating mode.

Alternatively, after the step of uploading current mode information of the requester to the cloud server, the method further comprises: receiving, from the cloud server, a result of an operation that the controlling party performs on the requester.

Accordingly, an embodiment of the disclosure further provides an apparatus for requesting remote access to cloud applications, the apparatus comprising: a secure channel establishing unit, configured to establish a secure channel with a cloud server; an access request sending unit, configured to send to the cloud server an access request requesting being accessed by a controlling party via the secure channel, the access request comprising account information of the requester and account information of the controlling party; and a mode information uploading unit, configured to upload current mode information of the requester to the cloud server.

Alternatively, the secure channel establishing unit comprises: a secure channel requesting sub-unit, configured to send a request for establishing the secure channel to the cloud server; the request for establishing the secure channel comprises a digital certificate of the requester; a feedback information receiving sub-unit, configured to receive feedback information, sent by the cloud server, about establishing the secure channel; and a secure channel establishing sub-unit, configured to determine a result of the feedback information receiving sub-unit; if the received feedback information indicating approval, establishing the secure channel with the cloud server.

Alternatively, the apparatus for requesting remote access to cloud applications further comprises: a digital certificate requesting unit, configured to, prior to the sending the request for establishing the secure channel to the cloud server, send to the cloud server a request for acquiring the digital certificate of the requester, wherein the digital certificate is used for establishing the secure channel with the cloud server; and a digital certificate receiving unit, configured to receive, from the cloud server, the digital certificate of the requester.

Alternatively, the secure channel establishing unit is specifically configured to establish an SSL secure channel or a TLS secure channel.

Alternatively, the apparatus for requesting remote access to cloud applications further comprises: a login operation receiving unit, configured to, prior to the establishing the secure channel with the cloud server, receive a login operation of the requester; a login verification request sending unit, configured to send to the cloud server a login request for logging into the requester, wherein the login request comprising the account information and a login password of the requester; a login information receiving unit, configured to receive mode information of a login success returned by the cloud server after the cloud server verifies the login request; and a connection establishing unit, configured to establish a connection with the cloud server.

Alternatively, the apparatus for requesting remote access to cloud applications further comprises: a feedback information receiving unit, configured to receive, from the cloud server, feedback information generated for the access request of the requester prior to the uploading the current mode information of the requester to the cloud server; and a feedback information determining unit, configured to receive a result of the feedback information receiving unit; and if the feedback information indicating approval, performing the step of uploading current mode information of the requester to the cloud server.

Alternatively, the mode information uploading unit further comprises: a local computation stopping sub-unit, configured to stop a local computation of the requester in the uploading the current mode information of the requester to the cloud server.

Alternatively, the local computation stopping sub-unit is specifically configured to inhibit initiation of the requester or suspend the initiation of the requester.

Alternatively, the mode information uploading unit is specifically configured to upload information not stored in the requester and a current operating mode.

Alternatively, the apparatus for requesting remote access to cloud applications further comprises: an operation result receiving unit, configured to receive, from the cloud server, a result of an operation that the controlling party performs on the requester after the uploading the current mode information of the requester to the cloud server.

Additionally, an embodiment of the disclosure further provides a method for involving a cloud server in remote access, the method comprising: establishing a secure channel with a requester; receiving an access request of a requester requesting being accessed by a controlling party via the secure channel, the access request comprising account information of the requester and account information of the controlling party; and sending to the controlling party the access request of a requester requesting being accessed by a controlling party, wherein the access request comprises the account information of the requester; establishing the secure channel with the controlling party based on the access request of a requester, sent by the requester, requesting being accessed by a controlling party; receiving current mode information of the requester uploaded by the requester; generating a login key based on the access request; sending, via the secure channel, the login key to the controlling party; receiving a login request, sent by the controlling party, for logging into the requester; the login request including the login key and the account information of the requester; verifying whether the login key is correct; if so, sending mode information of a login success to the controlling party; and pushing the current mode information of the requester to the controlling party, and establishing a remote access mode for the controlling party and the requester.

Alternatively, the establishing a secure channel with a requester specifically comprises: receiving a request, sent by the requester, for establishing the secure channel; the request for establishing the secure channel comprising a digital certificate of the requester; determining whether the digital certificate of the requester is correct; and if so, sending feedback information with approval as the content to the requester.

Alternatively, prior to the step of receiving a request for establishing the secure channel sent by the requester, the method further comprises: receiving a request, sent by the requester, for acquiring the digital certificate of the requester, wherein the digital certificate is used for establishing the secure channel with the cloud server; generating the digital certificate of the requester according to registration information of the requester; and sending the digital certificate of the requester to the requester.

Alternatively, after the step of establishing a secure channel with a requester, the method further comprises: receiving a login request, sent by the requester, for logging into the requester, wherein the login request comprises the account information and a login password of the requester; determining whether the account information and the login password of the requester in the login request match to each other and are correct; if the account information and the login password of the requester in the login request are correct, sending mode information of a login success to the requester; and establishing a connection with the requester.

Alternatively, after the step of sending to the controlling party an access request of a requester requesting being accessed by a controlling party, the method further comprises: receiving, from the controlling party, feedback information generated based on the access request of the requester; and sending to the requester feedback information generated by the controlling party based on the access request of the requester; and alternatively, the establishing the secure channel with the controlling party based on the access request of the requester specifically comprises: receiving a request, sent by the controlling party, for establishing the secure channel; the request for establishing the secure channel comprising a digital certificate of the controlling party; determining whether the digital certificate of the controlling party is correct; and if so, sending feedback information with approval as the content to the controlling party.

Alternatively, prior to the step of receiving a request, sent by the controlling party, for establishing the secure channel, the method further comprises: receiving a request, sent by the controlling party, for acquiring the digital certificate of the controlling party, wherein the digital certificate is used for establishing the secure channel with the cloud server; generating the digital certificate of the controlling party according to registration information of the controlling party; and sending the digital certificate of the controlling party to the controlling party.

Alternatively, the login key comprises: account information of the requester, account information of the controlling party, a time stamp when the login key is generated, and a verification code produced upon generation of the login key.

Alternatively, after the step of pushing the current mode information of the requester to the controlling party and establishing a remote access mode for the controlling party and the requester, the method further comprises: receiving a result of an operation that the controlling party performs on the requester; and sending the operation result to the requester.

Correspondingly, an embodiment of the disclosure further provides an apparatus for involving a cloud server in remote access, the apparatus comprising: a secure channel establishing unit, configured to establish a secure channel with a requester, and establish a secure channel with a controlling party based on an access request, sent by the requester, requesting being accessed by the controlling party; an access request receiving unit, configured to receive an access request, sent by the requester, requesting being accessed by a controlling party via the secure channel, the access request comprising account information of the requester and account information of the controlling party; an access request sending unit, configured to send to the controlling party the access request of the requester requesting being accessed by a controlling party, wherein the access request comprises the account information of the requester; a mode information receiving unit, configured to receive current mode information of the requester uploaded by the requester; a login key generating unit, configured to generate a login key based on the access request; a login key sending unit, configured to send, via the secure channel, the login key to the controlling party; a login request receiving unit, configured to receive a login request, sent by the controlling party, for logging into the requester, the login request including the login key and the account information of the requester; a login key verifying unit, configured to verify whether the login key is correct; a login mode sending unit, configured to receive a verification result of the login key verifying unit; and if the login key is correct, sending mode information of a login success to the controlling party; and a remote access establishing unit, configured to push the current mode information of the requester to the controlling party, and establish a remote access mode for the controlling party and the requester.

Alternatively, the secure channel establishing unit comprises: a requester secure channel establishing sub-unit, configured to receive a request, sent by the requester, for establishing the secure channel; the request for establishing the secure channel comprising a digital certificate of the requester; a requester digital certificate determining sub-unit, configured to determine whether the digital certificate of the requester is correct; and a requester feedback information sending sub-unit, configured to receive a determination result of the requester digital certificate determining unit; and if the digital certificate of the requester is correct, send feedback information with approval as the content to the requester.

Alternatively, the apparatus for involving a cloud server in remote access further comprises: a requester digital certificate request receiving unit, configured to receive a request, sent by the requester, for acquiring the digital certificate of the requester prior to the receiving the request, sent by the requester, for establishing the secure channel, wherein the digital certificate is used for establishing the secure channel with the cloud server; a requester digital certificate generating unit, configured to generate the digital certificate of the requester according to registration information of the requester; and a requester digital certificate sending unit, configured to send the digital certificate of the requester to the requester.

Alternatively, the apparatus for involving a cloud server in remote access further comprises: a login request receiving unit, configured to receive a login request, sent by the requester, for logging into the requester after the establishing the secure channel with the requester, wherein the login request comprises the account information and a login password of the requester; a login request determining unit, configured to determine whether the account information and the login password of the requester in the login request match to each other and are correct; a login information sending unit, configured to receive a determination result of the login request determining unit, and if the account information and the login password of the requester are correct, send mode information of a login success to the requester; and a connection establishing unit, configured to establish a connection with the requester.

Alternatively, the apparatus for involving a cloud server in remote access further comprises: a feedback information receiving unit, configured to receive, from the controlling party, feedback information generated based on the access request of the requester after the sending to the controlling party the access request of the requester; and a feedback information sending unit, configured to send to the requester feedback information generated by the controlling party based on the access request of the requester.

Alternatively, the secure channel establishing unit further comprises: a controlling party secure channel establishing sub-unit, configured to receive a request, sent by the controlling party, for establishing the secure channel; the request for establishing the secure channel comprising a digital certificate of the controlling party; a controlling party digital certificate determining sub-unit, configured to determine whether the digital certificate of the controlling party is correct; and a controlling party feedback information sending sub-unit, configured to receive a determination result of the controlling party digital certificate determining unit; and if the digital certificate of the controlling party is correct, send feedback information with approval as the content to the controlling party.

Alternatively, the apparatus for involving a cloud server in remote access further comprises: a controlling party digital certificate request receiving unit, configured to receive a request, sent by the controlling party, for acquiring the digital certificate of the controlling party prior to the receiving the request, sent by the controlling party, for establishing the secure channel, wherein the digital certificate is used for establishing the secure channel with the cloud server; a controlling party digital certificate generating unit, configured to generate the digital certificate of the controlling party according to registration information of the controlling party; and a controlling party digital certificate sending unit, configured to send the digital certificate of the controlling party to the controlling party.

Alternatively, the login key generated by the login key generating unit comprises the account information of the requester, account information of the controlling party, a time stamp when the login key is generated, and a verification code produced upon generation of the login key.

Alternatively, the apparatus for involving a cloud server in remote access further comprises an operation result receiving unit, configured to receive a result of an operation that the controlling party performs on the requester after the pushing the current mode information of the requester to the controlling party and the establishing a remote access mode for the controlling party and the requester; and an operation result sending unit, configured to send the operation result to the requester.

As compared with the prior art, embodiments of the disclosure have the following advantages: The disclosure provides a method, an apparatus, and a system for remotely accessing cloud applications, which are implemented by: receiving an access request of a requester, sent by a cloud server, requesting being accessed by a controlling party, wherein the access request comprises: account information of the requester; establishing a secure channel with the cloud server based on the access request of the requester, sent by the cloud server, requesting being accessed by the controlling party; receiving, via the safety channel, a login key generated based on the access request of the requester sent by the cloud server; generating, based on the login key, a login request for logging into the requester and sending the login request to the cloud server; the login request includes the login key and the account information of the requester; receiving mode information of a login success returned by the cloud server after the cloud server verifies the login request; and receiving current mode information of the requester pushed by the cloud server, and entering a remote access mode for the requester. The described technical solutions the following problems: the technical solutions of the disclosed embodiments remote access is not possible using RDP protocol between different operating systems; a request for remote access cannot be made between terminals; and wasting unnecessary resources on site traffic. In addition, the technical solutions of the disclosed embodiments also prevent the risk of password leakage during remote access.

BRIEF DESCRIPTION OF THE DRAWINGS

In order to more clearly illustrate the embodiments of the disclosure, the drawings used to describe some embodiments will be introduced briefly below. It is apparent that the drawings described below are merely some embodiments recorded in the disclosure, and those of ordinary skills in the art can also obtain other drawings according to these drawings.

DETAILED DESCRIPTION

Figure 1:
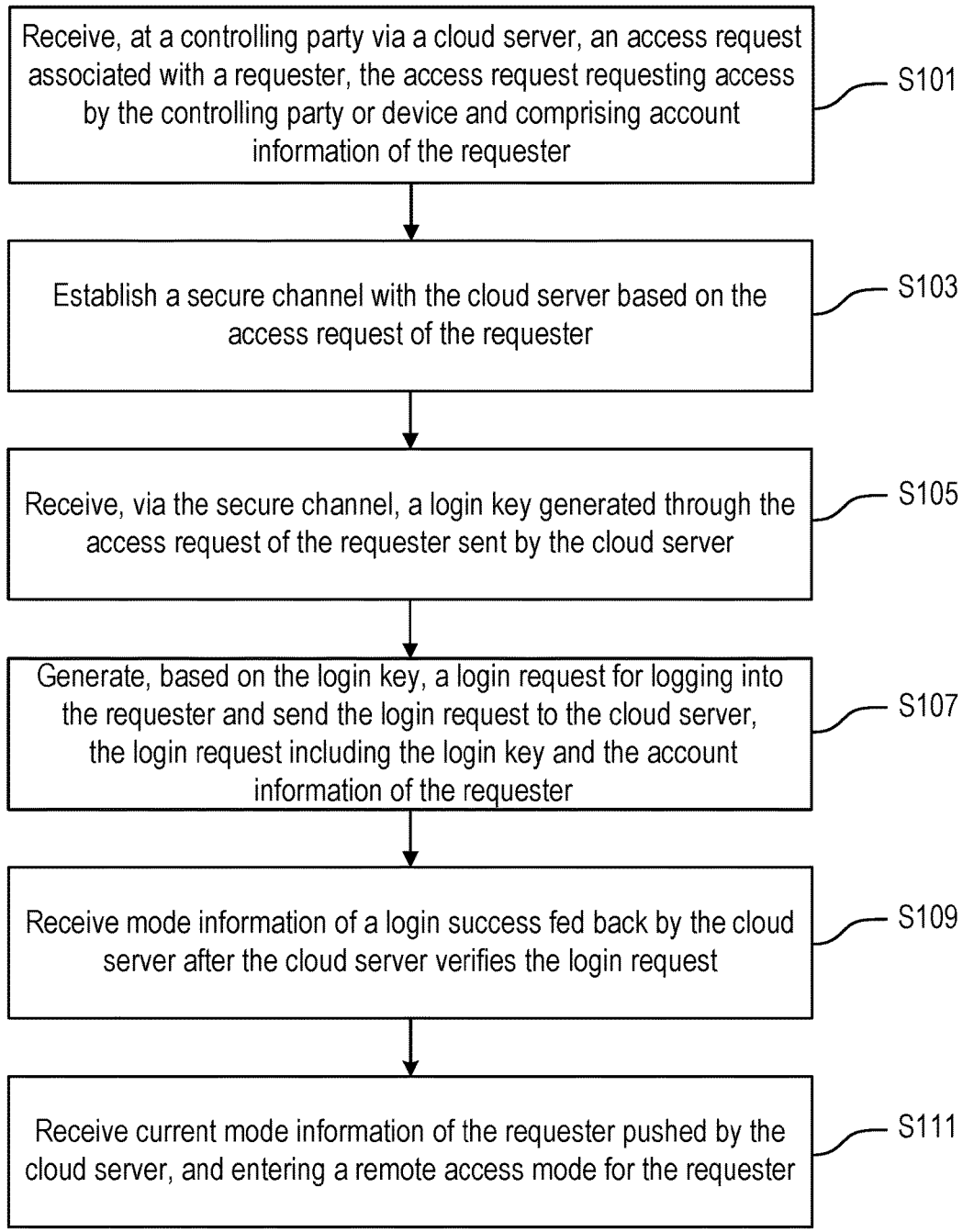
FIG. 1 is a flowchart illustrating a method for remotely accessing cloud applications according to some embodiments of the disclosure.

To make the above-mentioned objects, features and advantages of the disclosed embodiments more obvious and easy to understand, the disclosed embodiments are further described in detail below in conjunction with the accompanying figures and specific implementations. It should be noted that the embodiments of the disclosure and the features in the embodiments may be combined with one another without conflict.

A number of specific details are set forth in the following descriptions to facilitate a thorough understanding of the disclosed embodiments. However, the disclosed embodiments can be embodied in many ways other than those described in detail herein. Those skilled in the art may derive similar embodiments without departing from the spirit of the disclosure. Therefore, the disclosure should not be construed as being limited solely to the specific, explicit embodiments disclosed below.

The embodiments of the disclosure provide a method for remotely accessing cloud applications, an apparatus for remotely accessing cloud applications, a method for requesting remote access to cloud applications, an apparatus for requesting remote access to cloud applications, a method for involving a cloud server in remote access, an apparatus for involving a cloud server in remote access, and a system for remotely accessing cloud applications. Details are given in the following embodiments.

Currently, it is not possible to use the RDP protocol to achieve remote access between terminals of different operating systems. Screen information of a local terminal can be sent to a terminal for access by using an RFB (Remote Framebuffer) protocol. However, transmitting all the screen information of a local terminal would take up significant, valuable network traffic resources, and the greatest limitation in this regard is the network speed. If an MDM (Mobile Device Management) technology is used, it can only provide access for a server terminal to various accessed mobile devices, but the MDM technology cannot achieve the function of remote access among various mobile terminals. To address the above-mentioned problems, the technical solutions in the disclosed embodiments achieve the goal of performing remote access between terminals of different operating systems, saving the resources used for network traffic, and avoiding the risk of password leakage during remote access by authorizing a cloud application of a control terminal and using a temporary login key provided by a cloud server to log into the cloud application of the controlled terminal so as to control the terminal in a cloud application environment.

The working rationale of a cloud application is to transfer the traditional usage method of having software installed and computed locally into an on-demand access service, a new type of application, in which a remote server cluster can be connected and managed through the Internet or a local area network to implement business logic or computation tasks. A main carrier of the cloud application is an Internet technology, which is embodied as a thin client or a smart client with its interface construed using technologies such as HTML5, JAVASCRIPT, ADOBE FLASH, etc., or a combination thereof.

Although the technical solutions of the disclosure are proposed regarding the performing of remote access between terminals in a cloud application environment, the fields thereof are not limited to cloud applications. In an existing application, the method provided by the disclosure can be adopted and corresponding beneficial effects can be obtained as long as the server terminal can generate a login key for a temporary login and data in the application is stored or backed up in the server.

Before describing specific steps of the embodiments in detail, the control terminal cloud application and the controlled terminal cloud application involved in the technical solutions are first discussed briefly.

The technical solution of the disclosure is to offer a method for remote access between terminals in the cloud application environment, wherein a control terminal cloud application accesses the controlled terminal cloud application. The controlled terminal cloud application is the party sending a remote access request; the controlled terminal cloud application is referred to as a requester in the description of the embodiments below. The control terminal cloud application is the party that receives the remote access request; the control terminal cloud application is referred to as a controlling party in the description of the embodiments below. It should be noted that a cloud application can be used as a controlling party or a requester depending on different application scenarios; the embodiments are illustrated below in detail.

An embodiment of the disclosure provides a method for remotely accessing cloud applications. The method embodiment for remotely accessing cloud applications is as follows.

FIG. 1 is a flowchart illustrating a method for remotely accessing cloud applications according to some embodiments of the disclosure.

Generally, the method for remotely accessing cloud applications described in one embodiment is done by the controlling party. The controlling party receives a temporary login key allocated by a cloud server, and uses the login key to log into the requester.

The method for remotely accessing cloud applications further comprises the following steps.

Step S101: receive, at a controlling party via a cloud server, an access request associated with a requester, the access request requesting access by the controlling party or device and comprising account information of the requester.

In this embodiment, after the controlling party receives the access request, information of the access request pops up within a screen display region of a terminal operated by the controlling party and account information of the requester is displayed with the access request information.

After the controlling party receives the access request and verifies the account information of the requester, the controlling party further acts on the access request. The controlling party may accept the access request or reject the access request, comprising specific steps S101-1 to S101-2 as follows.

Step S101-1: receive a selection operation performed on the access request.

Step S101-2: send, to the cloud server, feedback information generated in response to the access request based on a result of the selection operation.

Specifically, if the controlling party receives an approval selection operation performed by the user on the access request, then, based on the selection operation, feedback information with approval as the content of consent will be generated for the access request of the requester, and the feedback information is sent to the cloud server. Similarly, if the controlling party receives a denial selection operation performed by the user on the access request, then, based on the selection operation, feedback information with a denial as the content will be generated for the access request of the requester, and the feedback information is sent to the cloud server.

In order to ease the selection for the user, the technical solution of the embodiment provides an implementation of receiving the selection operation performed on the access request, which specifically comprises steps S101-1-1 to S101-1-2.

In one embodiment, the receiving a selection operation performed on the access request comprises the following steps.

Step S101-1-1: display a corresponding selection window within a screen display region of the controlling device.

Step S101-1-2: receive a selection operation performed on an approval button or a denial button displayed in the selection window.

Specifically, after the information of the access request pops up within the screen display region of the terminal, the controlling party displays the corresponding selection window within the screen display region. The selection window includes selection controls for receiving the selection operation of the user.

The selection controls may take various forms such as a drop down list, a button, etc. In order to provide a friendlier graphic interface to the user, the embodiment provides an implementation in which a button selection control is adopted. That is to say, after the information of the access request pops up within the screen display region of the terminal, a selection control having the approval button and the denial button may be displayed within the screen display region of the terminal of the controlling party. When the button selection control is adopted, a touch operation performed on the approval button or the denial button by the user, such as a click operation or a long press operation, is received in this step.

The implementation of adopting the button selection control is described above. In other implementations, another method of displaying a text input box may also be adopted. Specifically, after the information of the access request pops up within the screen display region of the terminal of the controlling party, a text input box may be displayed in the screen display region. A virtual keyboard is displayed on the display screen at the same time so as to receive a user's touch operation performed on the virtual keyboard. The technical solution may also be achieved through this method. The subsequent details of this method will not be provided herein.

Step S103: establish a secure channel with the cloud server based on the access request of the requester.

In one embodiment, after performing the step S101 in which the controlling party receives the access request, a secure channel is established between the controlling party and the cloud server in order to protect the integrity of data exchange and information verification between the controlling party and the cloud server. The establishing the secure channel with the cloud server based on the access request may comprises steps S103-1, S103-2, and S103-3, as described below.

Step S103-1: send a request, to the cloud server, for establishing the secure channel, the request for establishing the secure channel comprising a digital certificate of the controlling party.

Step S103-2: receive feedback information, sent by the cloud server, about establishing the secure channel.

Step S103-3: if the received feedback information indicates approval, establishing the secure channel with the cloud server.

It should be noted that the request for establishing the secure channel includes the digital certificate issued by the cloud server to the controlling party for establishing the secure channel. Therefore, prior to the step of sending a request for establishing the secure channel to the cloud server, the controlling party firstly needs to acquire the digital certificate from the cloud server, which specifically comprises steps S103-01 to S103-02 as described below.

Step S103-01: send a request, to the cloud server, for acquiring the digital certificate of the controlling party, wherein the digital certificate is used for establishing the secure channel with the cloud server.

Step S103-02: receive, from the cloud server, the digital certificate of the controlling party.

It should be noted that in this embodiment, the established secure channel between the controlling party and the cloud server is an SSL secure channel. Thus the digital certificate used for establishing the secure channel with the cloud server is an SSL certificate.

The SSL certificate conforms to an SSL protocol, issued after verifying an identity of the server, and fulfills the functions of server identity verification and data transfer encryption, which is a technology of allowing communication between a web browser and a web server through a secure connection. This means that data is encrypted into a password at one end and sent out. The password is then decrypted at another end for processing. This is a bi-directional process; that is, both the browser and the server need to encrypt the data prior to sending the data. The safety protocol is mainly used to provide authentication for the user and the server; encrypt and hide transmitted data; and ensure that the data remains unchanged, i.e., data integrity, during transmission.

The implementation in which the SSL secure channel is adopted is described above. In other implementations, a TLS secure channel may also be established between the controlling party and the cloud server. Specifically, the TLS secure channel is used to provide confidentiality and data integrity between two communication applications. This protocol consists of two layers: a TLS record protocol and a TLS handshake protocol. The technical solution may also be implemented through this method. The subsequent details of this method will not be provided herein.

Step S105: receive, via the secure channel, a login key generated through the access request of the requester sent by the cloud server.

In this embodiment, the login key comprises the account information of the requester, account information of the controlling party, a timestamp when the login key is generated, and a verification code produced upon generation of the login key.

In one embodiment, the controlling party receives, via the secure channel, a token generated based on the access request of the requester sent by the cloud server. The token consists of the account information of the requester, the account information of the controlling party, a time stamp when the token is generated, and a set of random numbers produced upon generation of the token; that is, token=f(the account information of the requester, the account information of the controlling party, timestamp, random numbers).

It should be noted that the verification code produced upon generation of the login key refers to a set of random numbers produced upon generation of the login key. The verification code may also be in other forms, including any known manners, and does not exclude the use of other newly created manners, which is not limited herein. For example, a GIF animation verification code can be used.

Step S107: generate, based on the login key, a login request for logging into the requester and send the login request to the cloud server, the login request including the login key and the account information of the requester.

In one embodiment, the controlling party acquires the account information of the requester from the login key sent by the cloud server, places the account information of the requester and the login key received from the cloud server into the login request for logging into the requester, and sends the login request to the cloud server. It should be noted that the account information of the requester refers to an account name of the requester, i.e., a user name of the requester.

When the terminal logs into an application, a user name and a login password set by the user are usually used. The embodiment adopts the technical solution provided by the disclosure in which a user name of the cloud application and a login key provided by the cloud server are used to log into the application when the controlling party logs into the requester, thereby providing protection of the account information of the requester.

Regarding the situation that the user adopts the manner of using the login key for remotely accessing cloud applications provided by the technical solution, a common situation is that the login key is used for a temporary need occurring because of some unexpected situations, not used for a permanent need. The login key included in the login request in this step may be a temporary login key that is used only once (which is also referred to as a one-time login key). That is to say, after the controlling party uses the received login key to log into the requester for the first time, the login key will be expired.

Step S109: receive mode information of a login success returned by the cloud server after the cloud server verifies the login request.

In one embodiment, after the controlling party receives the mode information of a login success returned by the cloud server after the cloud server verifies the login request, the controlling party logs into the requester and establishes a connection with the cloud server.

Step S111: receive current mode information of the requester pushed by the cloud server, and entering a remote access mode for the requester.

In one embodiment, after performing step S109 in which the controlling party receives the mode information of a login success returned by the cloud server after the cloud server verifies the login request and the controlling party logs into the requester and establishes the connection with the cloud server, the current mode information of the requester pushed by the cloud server is received. The current mode information of the requester comprises information that is not stored locally, a local current operating mode, and information of the requester stored in the cloud server after the requester sends the access request.

After the controlling party receives the current mode information of the requester pushed by the cloud server and enters the remote access mode for the requester, the controlling party may perform an operation on the requester. The operation performed on the requester by the controlling party may be addition, modification, deletion, and inquiry on the information of the requester that is stored in the cloud server. For different cloud applications, specific operations in corresponding cloud applications may be further included. Specifically, the controlling party may perform an operation on all functions included in the requester that enters the remote access mode, which specifically comprises steps S113 to S114 as follows.

Step S113: receive an operation performed on the requester entering the remote access state.

Step S114: upload a result of the operation to the cloud server.

In the embodiments introduced above, a method for remotely accessing cloud applications is provided. The disclosure further provides an apparatus for remotely accessing cloud applications that corresponds to the method for remotely accessing cloud applications introduced above. Since the steps performed by the apparatus embodiment are similar to the method embodiment, the description thereof is relatively concise. Reference can be made to the description of the method embodiment for related description, the disclosure of which is incorporated herein by reference in its entirety. The apparatus embodiment described below is merely illustrative. The embodiment of the apparatus for remotely accessing cloud applications is as follows.

Figure 2:
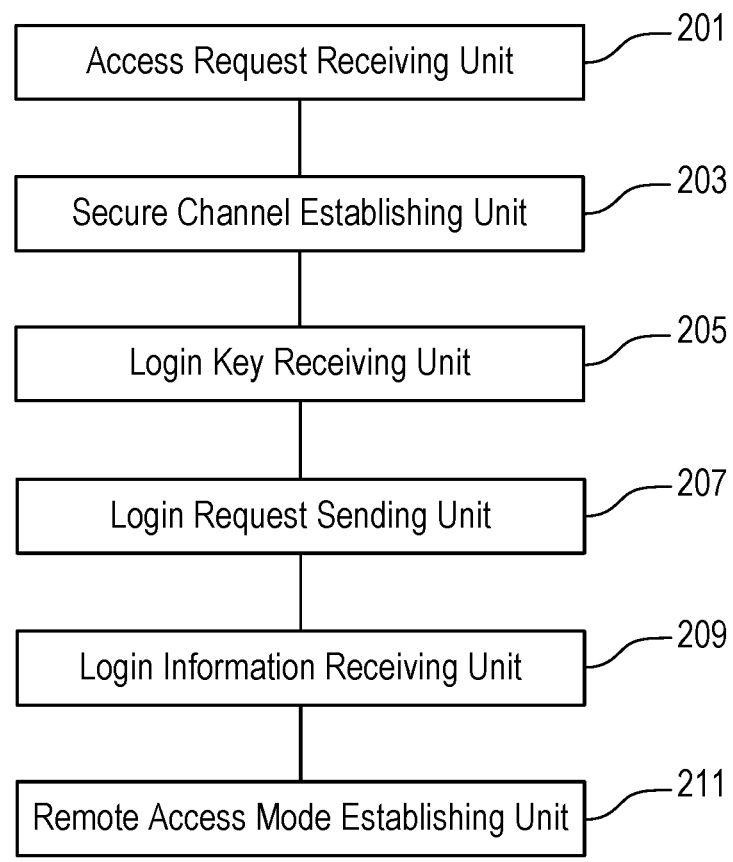
FIG. 2 is a block diagram illustrating an apparatus for remotely accessing cloud applications according to some embodiments of the disclosure.

FIG. 2 is a block diagram illustrating an apparatus for remotely accessing cloud applications according to some embodiments of the disclosure.

The apparatus for remotely accessing cloud applications comprises the following units.

An access request receiving unit 201, configured to receive, at a controlling party via a cloud server, an access request associated with a requester, the access request requesting access by the controlling party or device and comprising account information of the requester.

A secure channel establishing unit 203, configured to establish a secure channel with the cloud server based on the access request.

A login key receiving unit 205, configured to receive, via the secure channel, a login key generated through the access request of the requester sent by the cloud server.

A login request sending unit 207, configured to generate, based on the login key, a login request for logging into the requester and sending the login request to the cloud server, the login request including the login key and the account information of the requester.

A login information receiving unit 209, configured to receive mode information of a login success returned by the cloud server after the cloud server verifies the login request.

A remote access mode establishing unit 211, configured to receive current mode information of the requester pushed by the cloud server, and entering a remote access mode for the requester.

In one embodiment, the secure channel establishing unit 202 comprises the following sub-units.

A secure channel requesting sub-unit, configured to send a request, to the cloud server, for establishing the secure channel; the request for establishing the secure channel comprises a digital certificate of the controlling party.

A feedback information receiving sub-unit, configured to receive feedback information, sent by the cloud server, about establishing the secure channel.

A secure channel establishing sub-unit, configured to determine a result of the feedback information receiving sub-unit; and, if the received feedback information indicating approval, establishing the secure channel with the cloud server.

In one embodiment, the apparatus for remotely accessing cloud applications further comprises the following units.

A digital certificate requesting unit, configured to, prior to the sending the request to the cloud server for establishing the secure channel, sending a request, to the cloud server, for acquiring the digital certificate of the controlling party, wherein the digital certificate is used for establishing the secure channel with the cloud server.

A digital certificate receiving unit, configured to receive, from the cloud server, the digital certificate of the controlling party.

In one embodiment, the secure channel establishing unit 202 is specifically configured to establish an SSL secure channel or a TLS secure channel.

In one embodiment, the apparatus for remotely accessing cloud applications further comprises the following units.

A selection operation receiving unit, configured to receive a selection operation performed on the access request after the receiving the access request.

A feedback information sending unit, configured to send to the cloud server feedback information generated for the access request of the requester requesting being accessed by the controlling party based on a result of the selection operation.

In one embodiment, the selection operation receiving unit comprises the following units.

A selection window displaying unit, configured to display a corresponding selection window within a screen display region of the controlling party.

A selection operation receiving unit, configured to receive a selection operation performed on an approval button or a denial button displayed in the selection window.

In one embodiment, the apparatus for remotely accessing cloud applications further comprises the following units.

An operation receiving unit, configured to, after the receiving current mode information of the requester pushed by the cloud server and the entering the remote access mode for the requester, receive an operation performed on the requester entering the remote access mode.

An operation result uploading unit, configured to upload a result of the operation to the cloud server.

In one embodiment, the login key receiving unit is specifically configured to receive the account information of the requester, account information of the controlling party, a time stamp when the login key is generated, and a verification code produced upon generation of the login key.

In the embodiments introduced above, a method for remotely accessing cloud applications and an apparatus for remotely accessing cloud applications are provided. Moreover, the disclosure further provides a method for requesting remote access to cloud applications. The embodiment of the method for requesting remote access to cloud applications is as follows.

Figure 3:
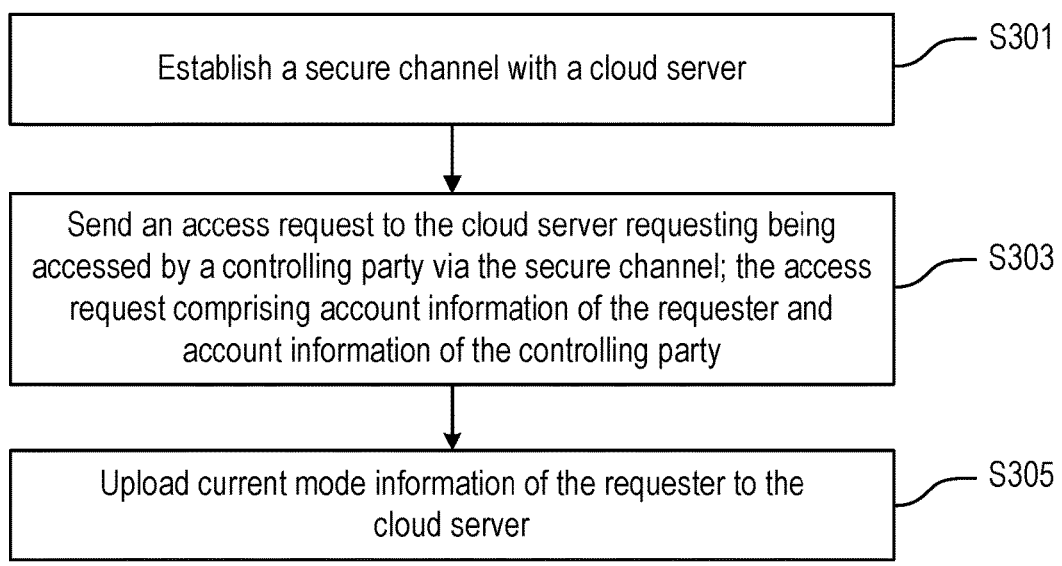
FIG. 3 is a flowchart illustrating a method for requesting remote access to cloud applications according to some embodiments of the disclosure.

FIG. 3 is a flowchart illustrating a method for requesting remote access to cloud applications according to some embodiments of the disclosure.

The method for requesting remote access to cloud applications comprises the following steps.

Step S301: establish a secure channel with a cloud server.

In one embodiment, in order to protect the integrity of data exchange and information verification between the requester and the cloud server, a secure channel needs to be established between the requester and the cloud server. The establishing the secure channel with the cloud server specifically comprises steps S301-1 to S303-3 as follows.

Step S301-1: send a request, to the cloud server, for establishing the secure channel, the request for establishing the secure channel comprising a digital certificate of the requester.

Step S301-2: receive feedback information, sent by the cloud server, about establishing the secure channel.

Step S301-3: if the received feedback information indicates approval, establish the secure channel with the cloud server.

It should be noted that the request for establishing the secure channel includes the digital certificate issued by the cloud server to the requester for establishing the secure channel. Therefore, prior to the step of sending a request for establishing the secure channel to the cloud server, the requester firstly needs to acquire the digital certificate from the cloud server, which specifically comprises steps S303-01 to S303-02 as follows.

Step S301-01: send a request, to the cloud server, for acquiring the digital certificate of the requester, wherein the digital certificate is used for establishing the secure channel with the cloud server.

Step S301-02: receive, from the cloud server, the digital certificate of the requester.

It should be noted that in this embodiment, the established secure channel between the requester and the cloud server is an SSL secure channel. Thus the digital certificate used for establishing the secure channel with the cloud server is an SSL certificate.

The embodiment in which the requester requests to establish the SSL secure channel with the cloud server is described above. In other embodiments, a TLS secure channel may also be established between the requester and the cloud server. Specifically, the TLS secure channel is used to provide confidentiality and data integrity between two communication applications. This protocol consists of two layers: a TLS record protocol and a TLS handshake protocol. The technical solution may also be implemented through this method. The subsequent details of this method will not be provided herein.

After the secure channel is established between the requester and the cloud server, the integrity of data exchange and information verification between the requester and the cloud server may be protected. Based on the secure channel, the requester may send a login request to the cloud server, wherein the login request comprises account information and a login password of the requester. The login of the requester specifically comprises the steps S302-1 to S302-4 below.

Step S302-1: receive a login operation of the requester.

Specifically, the requester receives the login operation performed on the requester by a user. For example, the user inputs the account information and the login password of the requester on a requester login interface, and then clicks a login button.

Step S302-2: send to the cloud server a login request for logging into the requester, wherein the login request comprising the account information and a login password of the requester.

In one embodiment, the account information and the login password of the requester are placed in the login request for logging into the requester and the login request is sent to the cloud server.

Step S302-3: receive mode information of a login success returned by the cloud server after the cloud server verifies the login request.

Step S302-4: establish a connection with the cloud server.

After receiving the mode information of a login success returned by the cloud server after the cloud server verifies the login request according to Step S302-4 introduced above, the requester successfully logs in and establishes the connection with the cloud server based on the account information of the requester in the mode information of the login success.

Step S303: send an access request to the cloud server requesting being accessed by a controlling party via the secure channel, the access request comprising account information of the requester and account information of the controlling party.

In one embodiment, the sending to the cloud server, via the secure channel, an access request requesting being accessed by the controlling party may be implemented by adopting the following manner: the user inputs the account information of the controlling party in an access request interface of the requester; the requester acquires the account information of the controlling party inputted by the user; places the account information of the requester and the acquired account information of the controlling party into the access request requesting being accessed by the controlling party; and sends to the cloud server, via the secure channel, the access request requesting being accessed by the controlling party. For example, the user clicks an access request button in the requester and inputs the account information of the controlling party in a window that pops up; or/and after the user clicks the access request button, a drop down list containing a list of contacts stored in the requester is displayed; and the user selects the controlling party from the list of contacts of the drop down list.

Step S305: upload current mode information of the requester to the cloud server.

In this embodiment, after performing step S303, because the controlling party may accept or reject the access request sent by the requester, it is necessary to receive feedback information of the controlling party for the access request, sent by the requester to the cloud server via the secure channel, requesting being accessed by the controlling party prior to performing step S305. Specific details include steps S304-1 to S304-2 as follows.

Step S304-1: receive, from the cloud server, feedback information generated for the access request of the requester.

It should be noted that if the controlling party receives the access request sent by the requester, the feedback information, generated by the controlling party based on the access request from the requester, includes approval as its content. Similarly, if the controlling party rejects the access request sent by the requester, the feedback information, generated by the controlling party based on the access request from the requester, includes a denial as its content.

Step S304-2: if the feedback information indicating approval, perform the step of uploading current mode information of the requester to the cloud server.

After the requester receives the feedback information generated by the controlling party based on the access request, a determination is made for the feedback information; if the feedback information includes approval as its content, step S305 is performed.

In one embodiment, after the requester sends, via the secure channel, the access request to the cloud server and before receiving the feedback information generated by the controlling party based on the access request of the requester, the user typically is still performing an operation on the requester. Therefore, the operation performed on the requester by the user may not be saved when the controlling party accepts the access request of the requester. Data information is not complete when the controlling party receives the information of the requester stored on the cloud server that is pushed by the cloud server. Therefore, after the requester receives the feedback information, the current mode information of the requester needs to be uploaded to the cloud server. The current mode information of the requester comprises information not stored in the requester and a current operating mode.

After the step of the requester uploading the current mode information of the requester to the cloud server, the controlling party has already entered the remote access mode for the requester. If the user continues to perform an operation on the requester, a conflict may occur in the data information when the controlling party operates in the remote access mode. In order to prevent the user from continuously performing an operation on the requester, the following steps may be performed.

In one embodiment, a local computation of the requester also needs to be stopped while uploading the current mode information of the requester to the cloud server. The stopping a local computation of the requester comprises inhibiting initiation of the requester, or suspending the initiation of the requester.

In one embodiment, after performing step S305, it is also necessary to receive a result of the operation performed on the requester by the controlling party after performing the remote access, which specifically comprises step S306 as follows.

Step S306: receiving, from the cloud server, a result of an operation that the controlling party performs on the requester.

The step of receiving an operation result, sent by the cloud server, of the controlling party performed on the requester may be achieved by adopting the following manner: the requester receives the operation result, sent by the cloud server, of the controlling party performed on the requester; the operation result displays content of the data information of the requester that is modified by the controlling party.

In the embodiments introduced above, a method for requesting remote access to cloud applications is provided. The disclosure further provides an apparatus for requesting remote access to cloud applications that corresponds to the method for requesting remote access to cloud applications introduced above. Since the steps performed by the apparatus embodiment are similar to the method embodiment, the description thereof is relatively concise. Reference can be made to the description of the method embodiment for related description, the disclosure of which is incorporated herein by reference in its entirety. The apparatus embodiment described below is merely illustrative. The embodiment of the apparatus for requesting remote access to cloud applications is as follows.

Figure 4:
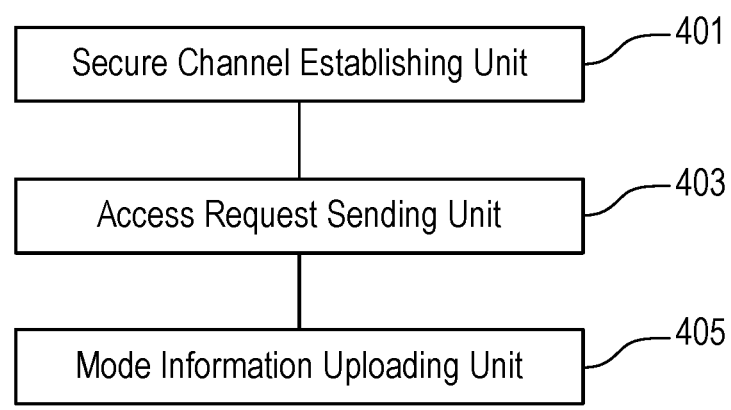
FIG. 4 is a block diagram illustrating an apparatus for requesting remote access to cloud applications according to some embodiments of the disclosure.

FIG. 4 is a block diagram illustrating an apparatus for requesting remote access to cloud applications according to some embodiments of the disclosure.

The apparatus for requesting remote access to cloud applications comprises the following units.

A secure channel establishing unit 401, configured to establish a secure channel with a cloud server.

An access request sending unit 403, configured to send to the cloud server an access request via the secure channel, the access request comprising account information of the requester and account information of the controlling party.

A mode information uploading unit 405, configured to upload current mode information of the requester to the cloud server.

Alternatively, the secure channel establishing unit 401 comprises the following sub-units.

A secure channel requesting sub-unit, configured to send a request for establishing the secure channel to the cloud server; the request for establishing the secure channel comprises a digital certificate of the requester.

A feedback information receiving sub-unit, configured to receive feedback information, sent by the cloud server, about establishing the secure channel.

A secure channel establishing sub-unit, configured to determine a result of the feedback information receiving sub-unit; and, if the received feedback information indicating approval, establishing the secure channel with the cloud server.

Alternatively, the apparatus for requesting remote access to cloud applications further comprises the following units.

A digital certificate requesting unit, configured to, prior to the sending the request for establishing the secure channel to the cloud server, send to the cloud server a request for acquiring the digital certificate of the requester, wherein the digital certificate is used for establishing the secure channel with the cloud server.

A digital certificate receiving unit, configured to receive, from the cloud server, the digital certificate of the requester.

Alternatively, the secure channel establishing unit 401 is specifically configured to establish an SSL secure channel or a TLS secure channel.

Alternatively, the apparatus for requesting remote access to cloud applications further comprises the following units.

A login operation receiving unit, configured to, prior to the establishing the secure channel with the cloud server, receive a login operation of the requester.

A login verification request sending unit, configured to send to the cloud server a login request for logging into the requester, wherein the login request comprising the account information and a login password of the requester.

A login information receiving unit, configured to receive mode information of a login success returned by the cloud server after the cloud server verifies the login request.

A connection establishing unit, configured to establish a connection with the cloud server.

Alternatively, the apparatus for requesting remote access to cloud applications further comprises the following units.

A feedback information receiving unit, configured to receive, from the cloud server, feedback information generated for the access request of the requester prior to the uploading the current mode information of the requester to the cloud server.

A feedback information determining unit, configured to receive a result of the feedback information receiving unit; and if the feedback information indicating approval, performing the step of uploading current mode information of the requester to the cloud server.

Alternatively, the mode information uploading unit 403 further comprises the following sub-units.

A local computation stopping sub-unit, configured to stop a local computation of the requester in the uploading the current mode information of the requester to the cloud server.

Alternatively, the local computation stopping sub-unit is specifically configured to inhibit initiation of the requester or suspend the initiation of the requester.

Alternatively, the mode information uploading unit 403 is specifically configured to upload information not stored in the requester and a current operating mode.

Alternatively, the apparatus for requesting remote access to cloud applications further comprises the following units.

An operation result receiving unit, configured to receive, from the cloud server, a result of an operation that the controlling party performs on the requester after the uploading the current mode information of the requester to the cloud server.

The embodiments introduced above provide a method for pushing information, an apparatus for pushing information, a method for requesting remote access to cloud applications, and an apparatus for requesting remote access to cloud application. Moreover, the disclosure further provides a method for involving a cloud server in remote access. An embodiment of the method for involving a cloud server in remote access is as follows.

Figure 5:
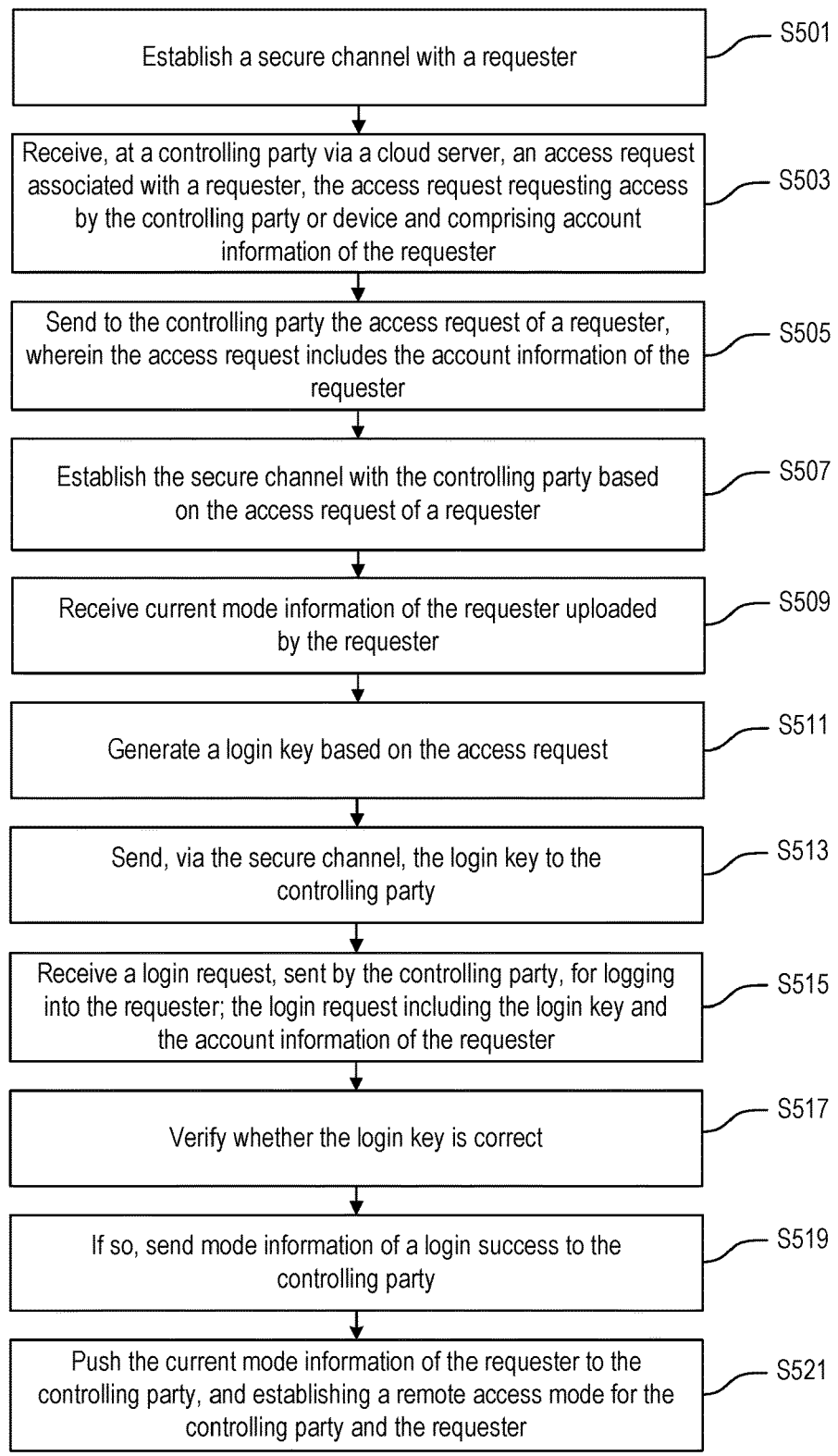
FIG. 5 is a flowchart illustrating a method for involving a cloud server in remote access according to some embodiments of the disclosure.

FIG. 5 is a flowchart illustrating a method for involving a cloud server in remote access according to some embodiments of the disclosure.

The apparatus for involving a cloud server in remote access comprises the following steps.

Step S501: establish a secure channel with a requester.

In one embodiment, in order to protect the integrity of data exchange and information verification between the requester and the cloud server, the cloud server needs to establish a secure channel with the requester. The establishing the secure channel with the requester specifically comprises steps S501-1 to S503-3 as follows.

Step S501-1: receive a request, sent by the requester, for establishing the secure channel, the request for establishing the secure channel comprising a digital certificate of the requester.

Step S501-2: determine whether the digital certificate of the requester is correct.

Step S501-3: if so, send feedback information with approval as the content to the requester.

It should be noted that the cloud server acquires the digital certificate of the requester from the request for establishing the secure channel sent by the requester and compares the digital certificate with a digital certificate of the requester that is stored in the cloud server. If the digital certificate is correct, feedback information with approval as the content is sent to the requester; if the digital certificate is not correct, feedback information with a denial as the content is sent to the requester.

Moreover, since the request for establishing the secure channel received by the cloud server includes the digital certificate issued by the cloud server to the requester for establishing the secure channel, prior to the step of receiving the request for establishing the secure channel sent by the requester, the cloud server firstly needs to issue the digital certificate to the requester, which specifically comprises steps S501-01 to S501-03 as follows.

Step S501-01: receive a request, sent by the requester, for acquiring the digital certificate of the requester, wherein the digital certificate is used for establishing the secure channel with the cloud server.

Step S501-02: generate the digital certificate of the requester according to registration information of the requester.

Step S501-03: send the digital certificate of the requester to the requester.

It should be noted that in this embodiment, the established secure channel between the cloud server and the requester is an SSL secure channel, thus the digital certificate used for establishing the secure channel with the cloud server is an SSL certificate.

The implementation in which the cloud server accepts the request of establishing the SSL secure channel with the requester is described above. In other implementations, a TLS secure channel may also be established between the cloud server and requester. Specifically, the TLS secure channel is used to provide confidentiality and data integrity between two communication applications. This protocol consists of two layers: a TLS record protocol and a TLS handshake protocol. The technical solution may also be implemented through this method. The subsequent details of this method will not be provided herein.

After the secure channel is established between the cloud server and the requester, the integrity of the data exchange and the information verification between the cloud server and the requester may be protected. Based on the secure channel, the cloud server may receive the login request sent by the requester. The step of the cloud server accepting and verifying the login request specifically comprises the steps S502-1, S502-2, S502-3, and S502-4 below.

Step S502-1: receive a login request, sent by the requester, for logging into the requester, wherein the login request comprises the account information and a login password of the requester.

Specifically, the cloud server acquires the account information and the login password of the requester from the login request.

Step S502-2: determine whether the account information and the login password of the requester in the login request match to each other and are correct.

The account information and the login password of the requester stored in the cloud server are inquired; and determine whether the inquired account information and the login password match the account information and the login password of the requester acquired in step S502-1 and are correct.

Step S502-3: if the account information and the login password of the requester in the login request are correct, send mode information of a login success to the requester; and Step S502-4: establish a connection with the requester.

After sending the mode information of a login success to the requester according to step S502-3 above, the connection with the requester is established based on the account information of the requester in the mode information of a login success.

Step S503: receive, at a controlling party via a cloud server, an access request associated with a requester, the access request requesting access by the controlling party or device and comprising account information of the requester.

In one embodiment, the cloud server receives an access request of a requester via the secure channel; and acquires the account information of the requester and the account information of the controlling party from the access request.

Step S505: send to the controlling party the access request of a requester, wherein the access request includes the account information of the requester.

In one embodiment, the cloud server searches for the controlling party based on the account information of the controlling party acquired in step S503. If the controlling party is found, the access request from the requester is sent to the controlling party, the access request comprises account information of the requester.

After sending to the controlling party the access request from the requester, because the controlling party may accept or reject the access request sent by the requester, the cloud server further needs to receive the feedback information of the controlling party for the sent access request, which specifically comprises steps S505-1 and S505-2 as follows.

Step S505-1: receive, from the controlling party, feedback information generated based on the access request of the requester.

Step S505-2: send to the requester feedback information generated by the controlling party based on the access request of the requester.

It should be noted that after the cloud server receives the feedback information, generated based on the access request of the requester, sent by the controlling party, since the requester does not know whether the controlling party accepts the access request from the requester, the feedback information generated by the controlling party based on the access request of the requester also needs to be sent to the requester.

Step S507: establish the secure channel with the controlling party based on the access request of a requester.

In one embodiment, in order to protect the integrity of data exchange and information verification between the controlling party and the cloud server, the cloud server needs to establish a secure channel with the controlling party. The establishing the secure channel with the controlling party specifically comprises steps S507-1, S507-2, and S507-3 as follows.

Step S507-1: receive a request, sent by the controlling party, for establishing the secure channel; the request for establishing the secure channel comprising a digital certificate of the controlling party;

Step S507-2: determine whether the digital certificate of the controlling party is correct; and Step S507-3: if so, send feedback information with approval as the content to the controlling party.

It should be noted that the cloud server acquires the digital certificate of the controlling party from the request for establishing the secure channel sent by the controlling party and compares the digital certificate with a digital certificate of the controlling party that is stored in the cloud server. If the digital certificate is correct, feedback information with approval as the content is sent to the controlling party; if the digital certificate is not correct, feedback information with a denial as the content is sent to the controlling party.

Moreover, since the request for establishing the secure channel received by the cloud server includes the digital certificate issued by the cloud server to the controlling party for establishing the secure channel, prior to the step of receiving the request for establishing the secure channel sent by the controlling party, the cloud server firstly needs to issue the digital certificate to the controlling party, which specifically comprises steps S507-01, S507-02, and S507-03 as follows.

Step S507-01: receive a request, sent by the controlling party, for acquiring the digital certificate of the controlling party, wherein the digital certificate is used for establishing the secure channel with the cloud server;

Step S507-02: generate the digital certificate of the controlling party according to registration information of the controlling party; and Step S507-03: send the digital certificate of the controlling party to the controlling party.

It should be noted that in one embodiment, the established secure channel between the cloud server and the controlling party is an SSL secure channel; thus the digital certificate used for establishing the secure channel with the cloud server is an SSL certificate.

The implementation in which the cloud server accepts the SSL secure channel with the controlling party is described above. In other implementations, a TLS secure channel may also be established between the cloud server and the controlling party. Specifically, the TLS secure channel is used to provide confidentiality and data integrity between two communication applications. This protocol consists of two layers: a TLS record protocol and a TLS handshake protocol. The technical solution may also be implemented through this method. The subsequent details of this method will not be provided herein.

Step S509: receive current mode information of the requester uploaded by the requester.

In this embodiment, the cloud server receives the current mode information of the requester uploaded by the requester and saves the current mode information of the requester in the cloud server. The current mode information of the requester comprises information not stored in the requester and a current operating mode.

Step S511: generate a login key based on the access request.

In this embodiment, the generating a login key based on the access request requesting being accessed by the controlling party may be done by adopting the following steps.

Step S511-1, the cloud server generates the login key based on the access request requesting being accessed by the controlling party; the cloud server generates the login key based on the account information of the requester and the account information of the controlling party acquired from the access request.

Step S511-2: a verification code is generated and a time stamp at the time when the login key is generated is acquired.

Step S511-3, the time stamp and the verification code are placed into the login key.

It could be understood that the login key comprises the account information of the requester, account information of the controlling party, a time stamp when the login key is generated, and a verification code produced upon generation of the login key.

It should be noted that the generated verification code refers to a set of random numbers produced upon generation of the login key and the verification code is generated for enhancing the security of the login key. The verification code may also be in other forms, including any known manners, and does not exclude the use of other newly created manners, which is not limited herein. For example, a GIF animation verification code can be used.

It should be noted that the login key generated in step S511 is a temporary login key that is used only once (which is also referred to as a one-time login key). That is to say, after the controlling party uses the received login key to log into the requester for the first time, the login key will be expired.

During a specific implementation, the cloud server generates the login key based on the access request requesting being accessed by the controlling party; the cloud server generates a token based on the account information of the requester and the account information of the controlling party acquired from the access requester; generates the verification code and acquires the time stamp when the token is generated; and places the time stamp and the verification code into the token. The token consists of the account information of the requester, the account information of the controlling party, a time stamp when the token is generated, and a set of random numbers produced upon generation of the token; that is, token=f(the account information of the requester, the account information of the controlling party, timestamp, random number).

Step S513: send, via the secure channel, the login key to the controlling party.

In one embodiment, the cloud server sends the login key generated in step S511 to the controlling party via the secure channel. The login key comprises the account information of the requester, account information of the controlling party, a time stamp when the login key is generated, and a verification code produced upon generation of the login key.

Step S515: receive a login request, sent by the controlling party, for logging into the requester, the login request including the login key and the account information of the requester.

In one embodiment, the cloud server receives the login request, sent by the controlling party, for logging into the requester; and acquires the login key and the account information of the requester from the login request. It should be noted that the account information of the requester refers to an account name of the requester, i.e., a user name of the requester.

Step S517: verify whether the login key is correct.

The verifying whether the login key is correct may be done by adopting the following manner.

A login key of the account name of the requester in the cloud server is inquired according to the account name of the requester acquired in step S515.

It is determined whether the login key acquired in step S515 and the login key inquired in the cloud server are correct is determined.

If the login key acquired in step S515 and the login key inquired in the cloud server are correct, the process proceeds to step S519.

Step S519: if the login key acquired in step S515 and the login key inquired in the cloud server are correct, send mode information of a login success to the controlling party.

In one embodiment, a determination result in step S517 is received and the mode information of a login success is sent to the controlling party and the connection with the controlling party is established.

Step S521: push the current mode information of the requester to the controlling party, and establishing a remote access mode for the controlling party and the requester.

In one embodiment, the current mode information of the requester in the cloud server is determined and the current mode information of the requester is pushed to the controlling party. The current mode information of the requester comprises information that is not stored locally, a local current operating mode, and information of the requester stored in the cloud server after the requester sends the access request.

After establishing the remote access mode for the controlling party and the requester, a result of an operation that the controlling party performs on the requester also needs to be received; after the controlling party finishes the remote access mode for the requester, the operation result is sent to the requester, which specifically comprises steps S522 and S523.

Step S522: receive a result of an operation that the controlling party performs on the requester.

Step S523: send the operation result to the requester.

In the embodiments introduced above, a method for involving a cloud server in remote access is provided. The disclosure further provides an apparatus for involving a cloud server in remote access that corresponds to the method for involving a cloud server in remote access introduced above. Since the steps performed by the apparatus embodiment are similar to the method embodiment, the description thereof is relatively concise. Reference can be made to the description of the method embodiment for further description, the disclosure of which is incorporated herein by reference in its entirety. The apparatus embodiment described below is merely illustrative. An embodiment in which a cloud server is involved in remote access is as follows.

Figure 6:
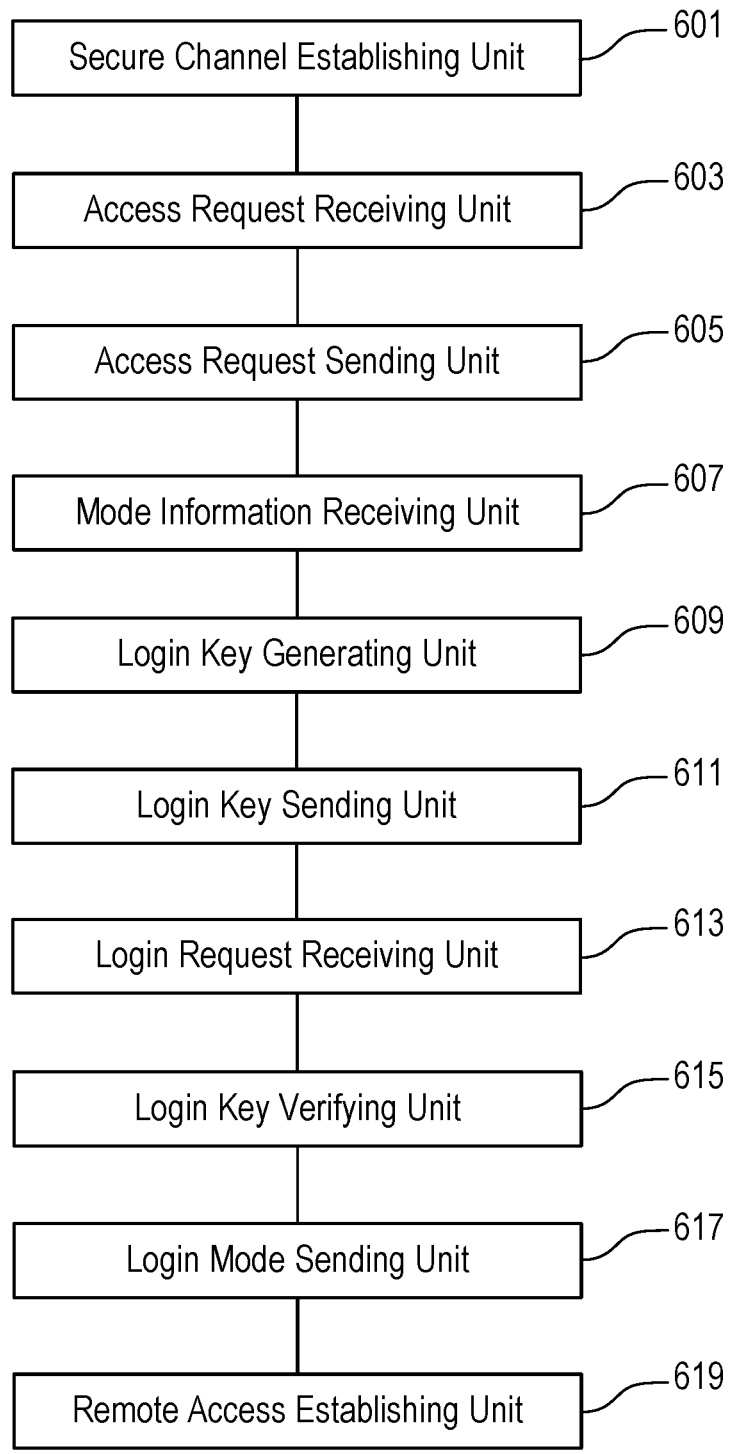
FIG. 6 is a block diagram illustrating an apparatus for involving a cloud server in remote access according to some embodiments of the disclosure.

FIG. 6 is a block diagram illustrating an apparatus for involving a cloud server in remote access according to some embodiments of the disclosure.

The apparatus for involving a cloud server in remote access comprises the following units.

A secure channel establishing unit 601, configured to establish a secure channel with a requester, and establish a secure channel with a controlling party based on an access request, sent by the requester, requesting being accessed by the controlling party.

An access request receiving unit 603, configured to receive an access request, sent by the requester, requesting being accessed by a controlling party via the secure channel, the access request comprising account information of the requester and account information of the controlling party.

An access request sending unit 605, configured to send to the controlling party the access request of the requester requesting being accessed by a controlling party, wherein the access request comprises the account information of the requester.

A mode information receiving unit 607, configured to receive current mode information of the requester uploaded by the requester.

A login key generating unit 609, configured to generate a login key based on the access request requesting being accessed by the controlling party.

A login key sending unit 611, configured to send, via the secure channel, the login key to the controlling party.

A login request receiving unit 613, configured to receive a login request, sent by the controlling party, for logging into the requester, the login request including the login key and the account information of the requester.

A login key verifying unit 615, configured to verify whether the login key is correct.

A login mode sending unit 617, configured to receive a verification result of the login key verifying unit; and if the login key is correct, sending mode information of a login success to the controlling party.

A remote access establishing unit 619, configured to push the current mode information of the requester to the controlling party, and establish a remote access mode for the controlling party and the requester.

Alternatively, the secure channel establishing unit 601 comprises the following sub-units.

A requester secure channel establishing sub-unit, configured to receive a request, sent by the requester, for establishing the secure channel, the request for establishing the secure channel comprising a digital certificate of the requester.

A requester digital certificate determining sub-unit, configured to determine whether the digital certificate of the requester is correct.

A requester feedback information sending sub-unit, configured to receive a determination result of the requester digital certificate determining unit; and if the digital certificate of the requester is correct, send feedback information with approval as the content to the requester.

Alternatively, the apparatus for involving a cloud server in remote access further comprises the following units.

A requester digital certificate request receiving unit, configured to receive a request, sent by the requester, for acquiring the digital certificate of the requester prior to the receiving the request, sent by the requester, for establishing the secure channel, wherein the digital certificate is used for establishing the secure channel with the cloud server.

A requester digital certificate generating unit, configured to generate the digital certificate of the requester according to registration information of the requester.

A requester digital certificate sending unit, configured to send the digital certificate of the requester to the requester.

Alternatively, the apparatus for involving a cloud server in remote access further comprises the following units.

A login request receiving unit, configured to receive a login request, sent by the requester, for logging into the requester after the establishing the secure channel with the requester, wherein the login request comprises the account information and a login password of the requester;

A login request determining unit, configured to determine whether the account information and the login password of the requester in the login request match to each other and are correct.

A login information sending unit, configured to receive a determination result of the login request determining unit, and if the account information and the login password of the requester are correct, send mode information of a login success to the requester.

A connection establishing unit, configured to establish a connection with the requester.

Alternatively, the apparatus for involving a cloud server in remote access further comprises the following units.

A feedback information receiving unit, configured to receive, from the controlling party, feedback information generated based on the access request of the requester requesting being accessed by the controlling party after the sending to the controlling party the access request of the requester requesting being accessed by the controlling party.

A feedback information sending unit, configured to send to the requester feedback information generated by the controlling party based on the access request of the requester requesting being accessed by the controlling party.

Alternatively, the secure channel establishing unit 601 further comprises the following sub-units.

A controlling party secure channel establishing sub-unit, configured to receive a request, sent by the controlling party, for establishing the secure channel; the request for establishing the secure channel comprising a digital certificate of the controlling party.

A controlling party digital certificate determining sub-unit, configured to determine whether the digital certificate of the controlling party is correct.

A controlling party feedback information sending sub-unit, configured to receive a determination result of the controlling party digital certificate determining unit; and if the digital certificate of the controlling party is correct, send feedback information with approval as the content to the controlling party.

Alternatively, the apparatus for involving a cloud server in remote access further comprises the following units.

A controlling party digital certificate request receiving unit, configured to receive a request, sent by the controlling party, for acquiring the digital certificate of the controlling party prior to the receiving the request, sent by the controlling party, for establishing the secure channel, wherein the digital certificate is used for establishing the secure channel with the cloud server.

A controlling party digital certificate generating unit, configured to generate the digital certificate of the controlling party according to registration information of the controlling party.

A controlling party digital certificate sending unit, configured to send the digital certificate of the controlling party to the controlling party.

Alternatively, the login key generated by the login key generating unit 605 comprises the account information of the requester, account information of the controlling party, a time stamp when the login key is generated, and a verification code produced upon generation of the login key.

Alternatively, the apparatus for involving a cloud server in remote access further comprises the following units.

An operation result receiving unit, configured to receive a result of an operation that the controlling party performs on the requester after the pushing the current mode information of the requester to the controlling party and the establishing a remote access mode for the controlling party and the requester.

An operation result sending unit, configured to send the operation result to the requester.

The above embodiments provide a method for pushing information, an apparatus for pushing information, a method for requesting remote access to cloud applications, an apparatus for requesting remote access to cloud application, a method for involving a cloud server in remote access, and an apparatus for involving a cloud server in remote access. Moreover, the disclosure further provides a system for remotely accessing cloud applications. An embodiment of the system for remotely accessing cloud applications is as follows.

Figure 7:
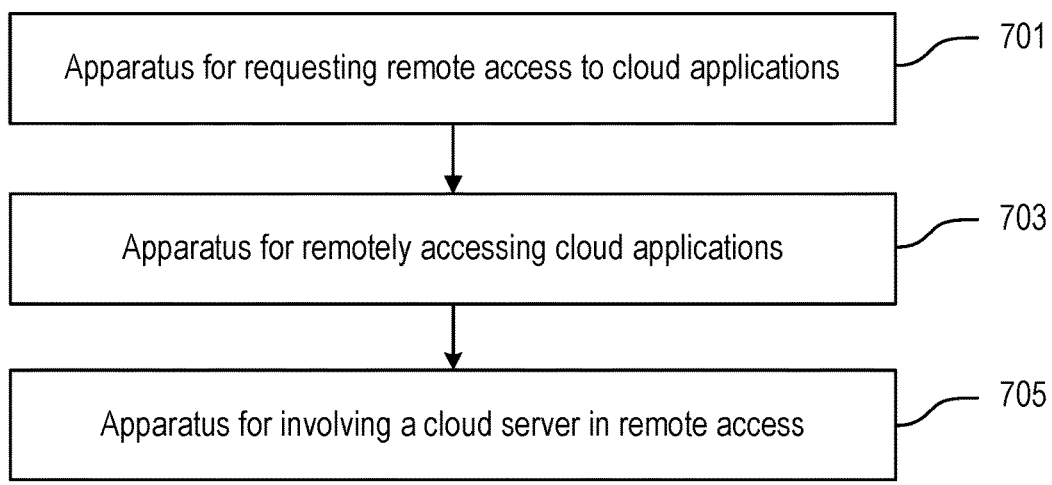
FIG. 7 is a block diagram illustrating a system for remotely accessing cloud applications according to some embodiments of the disclosure.

FIG. 7 is a block diagram illustrating a system for remotely accessing cloud applications according to some embodiments of the disclosure.

The system for remotely accessing cloud applications comprises an apparatus 701 for requesting remote access to cloud applications, an apparatus 703 for remotely accessing cloud applications, and an apparatus 705 for involving a cloud server in remote access.

The apparatus 701 for requesting remote access to cloud applications is configured to establish a secure channel with a cloud server; send to the cloud server, via the secure channel, an access request requesting being accessed by a controlling party; and upload current mode information of the requester.

The apparatus 702 for remotely accessing cloud applications is configured to receive the access request of the requester, sent by the cloud server, requesting being accessed by the controlling party; establish the secure channel with the cloud server; receive a login key sent by the cloud server through the secure channel; and access the requester by using the login key.

The apparatus 703 for involving a cloud server in remote access is configured to establish a secure channel with the requester and the controlling party; receive and send an access request of the requester requesting being accessed by the controlling party based on the secure channel; send a login key to the controlling party after generating the login key according to the access request; and is equipped with a database that stores user account data of the requester and the controlling party.

The system's procedures in remotely accessing cloud applications are briefly illustrated below. The apparatus 701 for requesting remote access to cloud applications is simply referred to as the requester; the apparatus 702 for remotely accessing cloud applications is simply referred to as the controlling party; the apparatus 703 for involving a cloud server in remote access is simply referred to as the cloud server.

(1) the controlling party sends to the cloud server a request for acquiring a digital certificate of the requester.

(2) the cloud server receives the request for acquiring the digital certificate of the controlling party and sends the digital certificate to the controlling party.

(3) the controlling party receives the digital certificate.

(4) the requester sends to the cloud server a request for acquiring a digital certificate of the requester.

(5) the cloud server receives the request for acquiring the digital certificate of the requester and sends the digital certificate to the requester.

(6) the requester receives the digital certificate.

(7) the requester uses the digital certificate to send a request for establishing the secure channel to the cloud server, the request for establishing the secure channel comprises the digital certificate of the requester.

(8) the cloud server receives the request for establishing the secure channel and determines whether the digital certificate in the request for establishing the secure channel is correct. If the digital certificate in the request for establishing the secure channel is correct, establishes the secure channel with the requester.

(9) the requester sends to the cloud server a login request for logging into the requester based on the secure channel, the login request comprising the account information and a login password of the requester.

(10) the cloud server receives the login request for logging into the requester and verifies whether the account information and the login password of the requester are correct; if the account information and the login password of the requester are correct, feeds back to the requester mode information of a login success.

(11) the requester sends an access request to the cloud server requesting being accessed by a controlling party via the secure channel, the access request comprising account information of the requester and account information of the controlling party.

(12) the cloud server inquires the controlling party based on the access request requesting being accessed by the controlling party and sends to the controlling party the access request of the requester requesting being accessed by the controlling party, the access request comprising the account information of the requester.

(13) the controlling party receives the access request requesting being accessed by the controlling party.

(14) the controlling party uses the digital certificate to send a request for establishing the secure channel to the cloud server, the request for establishing the secure channel comprising the digital certificate of the controlling party.

(15) the cloud server receives the request for establishing the secure channel and determines whether the digital certificate in the request for establishing the secure channel is correct. If the digital certificate in the request for establishing the secure channel is correct, establishes the secure channel with the requester.

(16) the controlling party performs a selection operation on the access request, and sends to the cloud server feedback information generated for the access request of the requester requesting being accessed by the controlling party based on a result of the selection operation.

(17) the cloud server receives the feedback information, generated based on the access request of the requester, sent by the controlling party, requesting being accessed by the controlling party; and sends to the requester feedback information generated by the controlling party based on the access request of the requester requesting being accessed by the controlling party.

(18) the requester receives, from the cloud server, feedback information generated for the access request of the requester requesting being accessed by the controlling party.

(19) the requester uploads current mode information of the requester to the cloud server.

(20) the server receives the current mode information of the requester uploaded by the requester.

(21) the cloud server generates a login key based on the access request requesting being accessed by the controlling party.

(22) the cloud server sends, via the secure channel, the login key to the controlling party.

(23) the controlling party receives, via the secure channel, a login key generated through the access request of the requester sent by the cloud server.

(24), the controlling party generates, based on the login key, a login request for logging into the requester and sends the login request to the cloud server, the login request including the login key and the account information of the requester.

(25) the cloud server receives the login request, sent by the controlling party, for logging into the requester, the login request including the login key and the account information of the requester.

(26) the cloud server verifies whether the login key is correct.

(27) if the login key is correct, the cloud server sends mode information of a login success to the controlling party.

(28) the controlling party receives the mode information of a login success returned by the cloud server after the cloud server verifies the login request.

(29) the cloud server pushes the current mode information of the requester to the controlling party, and establishes a remote access mode for the controlling party and the requester.

(30) the controlling party receives the current mode information of the requester pushed by the cloud server and enters a remote access mode for the requester.

(31) the controlling party receives an operation performed on the requester that enters the remote access mode; and uploads a result of the operation to the cloud server.

(32) the cloud server receives the operation result of the controlling party on the requester; and sends the operation result to the requester.

(33) the requester receives, from the cloud server, the operation result of the controlling party on the requester.

It should be noted that the description above illustrates one embodiment of the system, and different interaction methods may be adopted in other implementations. For example, the process of acquiring the digital certificate of (1) to (6), the process of the controlling party selecting and feeding back the access request of (16) to (18), and the process of performing a remote operation on the requester of (31) to (33) may be skipped. As long as the controlling party remotely accesses the requester through the process of establishing the secure channel of (7) to (8) and (14) to (15), the process of sending the access request of (11) to (13), the process of uploading the mode information of (19) to (20), and the process of the controlling party logging into the requester of (21) to (30), the implementation does not depart from the core of the disclosure and it falls within the scope of the disclosure.

In a typical configuration, a computing device comprises one or more processors (CPUs), input/output interfaces, network interfaces, and memories.

The memory may include a computer readable medium in the form of a non-permanent memory, a random access memory (RAM) and/or a non-volatile memory etc., such as a read-only memory (ROM) or a flash memory (flash RAM). The memory is an example of a computer readable medium.

The computer readable medium comprises permanent and non-permanent, movable and non-movable media that can achieve information storage by means of any methods or techniques. The information may be computer readable instructions, data structures, modules of programs or other data. Examples of storage medium of computer include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, read-only compact disc read-only memory (CD-ROM), digital versatile disk (DVD) or other optical storages, magnetic cassette, magnetic tape, magnetic disk storage or other magnetic storage devices, or any other non-transmission medium that can be used for storing information accessible by a computing device. In light of the definitions herein, the computer readable medium does not include non-transitory computer readable media (transitory media), such as modulated data signals and carrier waves.

It should be understood by those skilled in the art that the embodiments of the disclosure may be provided as a method, a system, or a computer program product. Thus, the disclosed embodiments may employ the form of a fully hardware embodiment, a fully software embodiment, or an embodiment combining software and hardware aspects. Moreover, the disclosed embodiments may employ the form of a computer program product implemented on one or more computer usable storage media (including but not limited to a magnetic disk memory, CD-ROM, an optical memory, etc.) containing computer usable program code therein.

Although particular embodiments of the disclosure are disclosed as above, the embodiments are not used to limit the disclosure. Any person skilled in the art may make possible changes and modifications without departing from the spirit and scope of the disclosure.

What is claimed is:

1. A method comprising:
  receiving, by a server, an access request from a device of a requester, the access request requesting access by a controlling party and comprising account information of the requester;
  transmitting, by the server, the access request to a device of the controlling party;
  receiving, by the server, a login request from the controlling party for logging into the requester device, the login request including a login key and account information of the requester;
  receiving, by the server, current mode information from the requester device upon verifying the login request; and
  entering, by the server, a remote access mode for the requester device in response to receiving the current mode information.

2. The method of claim 1, further comprising receiving, at the server, feedback information generated in response to the access request based on a result of a selection operation performed at the controlling device.

3. The method of claim 2, further comprising:
  causing, by the server, a selection window to be displayed at the controlling device, the selection window including an approval button and a denial button; and
  receiving, by the server, a selection operation performed on one of the approval button or the denial button.

4. The method of claim 1, further comprising:
  establishing, by the server, a secure channel with the controlling device;
  transmitting, via the secure channel, a login key to the controlling device, the login key generated based on the access request.

5. The method of claim 4 wherein establishing a secure channel with the controlling device comprises:
  receiving, at the server, a request to establish the secure channel from the controlling device, the request to establish the secure channel comprising a digital certificate of the controlling device;
  transmitting, by the server, feedback information to the controlling device, the feedback information including information regarding the secure channel; and
  establishing, by the server, the secure channel if the feedback information indicates an approval to establish the secure channel.

6. The method of claim 1, wherein the login key includes account information of the requester, account information of the controlling party, a timestamp when the login key was generated, and a verification code.

7. The method of claim 1, further comprising:
  receiving, at the server from the controlling device, an operation performed on the requester device; and
  receiving, at the server, a result of the operation.

8. The method of claim 7, wherein receiving current mode information of the requester device further comprises requesting that a local computation of the requester device be stopped prior to receiving the current mode information.

9. The method of claim 1, wherein the login request further includes a password of the requester device.

10. An apparatus comprising:
a processor; and
a non-transitory memory storing computer-executable instructions therein that, when executed by the processor, cause the apparatus to perform the operations of:
receiving an access request from a device of a requester, the access request requesting access by a controlling party and comprising account information of the requester;
transmitting, to a device of a controlling party, the access request to a device of the controlling party;
receiving a login request from the controlling party for logging into the requester device, the login request including a login key and account information of the requester;
receiving current mode information from the requester device upon verifying the login request; and
entering a remote access mode for the requester device in response to receiving the current mode information.

11. The apparatus of claim 10, wherein the operations further include receiving feedback information generated in response to the access request based on a result of a selection operation performed at the controlling device.

12. The apparatus of claim 11, wherein the operations further include:
causing a selection window to be displayed at the controlling device, the selection window including an approval button and a denial button; and
receiving a selection operation performed on one of the approval button or the denial button.

13. The apparatus of claim 10, wherein the operations further include:
establishing a secure channel with the controlling device;
transmitting, via the secure channel, a login key to the controlling device, the login key generated based on the access request.

14. The apparatus of claim 13 wherein establishing a secure channel with the controlling device comprises:
receiving a request to establish the secure channel from the controlling device, the request to establish the secure channel comprising a digital certificate of the controlling device;
transmitting feedback information to the controlling device, the feedback information including information regarding the secure channel; and
establishing the secure channel if the feedback information indicates an approval to establish the secure channel.

15. The apparatus of claim 10, wherein the login key includes account information of the requester, account information of the controlling party, a timestamp when the login key was generated, and a verification code.

16. The apparatus of claim 10, wherein the operations further include:
receiving, from the controlling device, an operation performed on the requester; and
receiving a result of the operation.

17. The apparatus of claim 16, wherein receiving current mode information of the requester device further comprises requesting that a local computation of the requester device be stopped prior to receiving the current mode information.

18. The apparatus of claim 10, wherein the login request further includes a password of the requester device.

19. A system comprising:
a controlling device operated by a controlling party;
a requester device operated by a requester and configured to generate an access request comprising account information of the requester; and
a server configured to:
receive an access request from a device of a requester, the access request requesting access by the controlling device and comprising account information of the requester device;
transmit, to the controlling device, the access request;
receive a login request from the controlling party for logging into the requester device, the login request including a login key and account information of the requester;
receive current mode information from the requester device upon verifying the login request; and
enter a remote access mode for the requester device in response to receiving the current mode information.

20. The system of claim 19 wherein the server is further configured to:
receive a request to establish the secure channel, the request to establish the secure channel comprising a digital certificate of the controlling device;
transmit feedback information to the controlling device, the feedback information including information regarding the secure channel;
establish the secure channel if the feedback information indicates an approval to establish the secure channel; and
transmit, via the secure channel, a login key to the controlling device, the login key generated based on the access request.

* * * * *